(12) United States Patent
Hong (10) Patent No.: US 12,507,261 B2
(45) Date of Patent: Dec. 23, 2025

(54) METHOD AND APPARATUS FOR TRANSMITTING SCI IN SIDELINK COMMUNICATION

(71) Applicants: HYUNDAI MOTOR COMPANY, Seoul (KR); KIA CORPORATION, Seoul (KR)

(72) Inventor: Ui Hyun Hong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 354 days.

(21) Appl. No.: 18/140,968

(22) Filed: Apr. 28, 2023

(65) Prior Publication Data
US 2023/0269756 A1 Aug. 24, 2023

Related U.S. Application Data

(63) Continuation-in-part of application No. PCT/KR2021/015589, filed on Nov. 1, 2021.
(Continued)

(30) Foreign Application Priority Data
Nov. 1, 2021 (KR) .................. KR10-2021-0148004

(51) Int. Cl.
*H04W 72/25* (2023.01)
*H04L 5/00* (2006.01)

(52) U.S. Cl.
CPC ........... *H04W 72/25* (2023.01); *H04L 5/0051* (2013.01)

(58) Field of Classification Search
CPC ..... H04W 72/25; H04W 92/18; H04W 16/14; H04L 5/0051; H04L 5/0044;
(Continued)

(56) References Cited

U.S. PATENT DOCUMENTS 11,201,772 B2 * 12/2021 Hwang .................. H04L 5/10
11,272,530 B2 * 3/2022 Davydov ............ H04B 7/0413
(Continued)

FOREIGN PATENT DOCUMENTS

BR 122024002814 A2 * 7/2024
CA 2946897 C * 9/2023 ........ H04W 72/1268
(Continued)

OTHER PUBLICATIONS

Panasonic, "Remaining issue on physical layer structure for sidelink in NR V2", 3GPP TSG RAN WG1 #102-e, eMeeting, Aug. 17-28, 2020, R1-2006535, 6 pages (Year: 2020).*
Hamidreza Shariatmadari; Achieving Ultrareliable Low-Latency Communications, IEEE 5G, Apr. 25, 2018 (Year: 2018).*
Extended European Search Report issued in corresponding European Application 21889487.1 dated Oct. 21, 2024.
(Continued)

*Primary Examiner* — Ayaz R Sheikh
*Assistant Examiner* — Louis Samara
(74) *Attorney, Agent, or Firm* — Morgan Lewis & Bockius LLP (57) ABSTRACT

A method and an apparatus for transmitting SCI in sidelink communication may include the steps of: receiving, from a base station, configuration information of the size of an SL subchannel set to a threshold value or higher for power saving of a receiving terminal; multiplexing a PSCCH and a first PSSCH DMRS in a frequency domain when the size of the SL subchannel is equal to or greater than the threshold value; and mapping second stage SCI to a symbol in which the first PSSCH DMRS is located.

12 Claims, 6 Drawing Sheets

Related U.S. Application Data (60) Provisional application No. 63/109,307, filed on Nov. 3, 2020.

(58) Field of Classification Search
CPC ... H04L 5/0092; H04L 5/0007; H04L 5/0094; Y02D 30/70; H04B 7/0695; H04B 7/0413
See application file for complete search history.

(56) References Cited

U.S. PATENT DOCUMENTS

| | | | | |
|---|---|---|---|---|
| 11,737,055 | B2* | 8/2023 | Shin | H04L 1/1896 370/330 |
| 2011/0013543 | A1* | 1/2011 | Lim | H04L 5/0094 370/329 |
| 2018/0302915 | A1* | 10/2018 | Einhaus | H04W 16/14 |
| 2019/0222364 | A1* | 7/2019 | Shimoda | H04L 1/189 |
| 2019/0260533 | A1* | 8/2019 | Manolakos | H04B 7/0456 |
| 2019/0380151 | A1* | 12/2019 | Kim | H04W 74/0833 |
| 2020/0053713 | A1* | 2/2020 | Bang | H04L 5/0053 |
| 2020/0084081 | A1* | 3/2020 | Yeo | H04L 5/0035 |
| 2020/0351124 | A1* | 11/2020 | Babaheidarian | H04L 5/16 |
| 2020/0359411 | A1* | 11/2020 | Li | H04W 16/14 |
| 2022/0022178 | A1* | 1/2022 | Wang | H04W 72/20 |
| 2022/0046430 | A1* | 2/2022 | Liu | H04B 7/0695 |
| 2022/0166582 | A1* | 5/2022 | Hwang | H04W 56/0025 |
| 2022/0166588 | A1* | 5/2022 | Hwang | H04L 5/0053 |

FOREIGN PATENT DOCUMENTS

| | | | | |
|---|---|---|---|---|
| CN | 111247866 A * | 6/2020 | | H04W 74/004 |
| KR | 20220059918 A * | 5/2022 | | H04L 5/0007 |
| WO | WO-2020087465 A1 * | 5/2020 | | H04L 5/0051 |
| WO | 2020/204642 A1 | 10/2020 | | |
| WO | WO-2020220853 A1 * | 11/2020 | | H04W 72/20 |
| WO | WO-2022025613 A1 * | 2/2022 | | H04L 69/28 |
| WO | WO-2022027660 A1 * | 2/2022 | | H04L 5/00 |

OTHER PUBLICATIONS

Huawei, HiSilicon, "Sidelink physical layer structure for NR V2x", 3GPP TSG RAN WG1 Meeting #98bis, Chongqing, China, Oct. 14-20, 2019, R1-1910054, 35 pages.

Apple, "On NR V2X Physical Layer Structure", 3GPP TSG RAN WG1 #99, Reno, USA, Nov. 18-22, 2019, R1-1912810, 15 pages.

Panasonic, "Remaining issue on physical layer structure for sidelink in NR V2", 3GPP TSG RAN WG1 #102-e, eMeeting, Aug. 17-28, 2020, R1-2006535, 6 pages.

Communication pursuant to Rules 70(2) and 70a(2) EPC issued in corresponding European Application 21889487.1 dated Nov. 8, 2024.

"Remaining issue on physical layer structure for sidelink in NR V2X," Panasonic, 3GPP TSG RAN WG1 #102-e, R1-2006535, e-meeting—Aug. 17-28, 2020.

"Remaining issues on physical layer structure for NR sidelink," CATT, 3GPP TSG RSN WG1 #103-e, R1-2007809, e-meeting—Oct. 26 through Nov. 13, 2020.

"Remaining issues of NR sidelink physical layer structure," ZTE, Sanechips, 3GPP TSG RAN WG1 #103-e, R1-2007921, e-meeting—Oct. 26 through Nov. 13, 2020.

"Remaining issue on physical layer structure and procedure for sidelink in NR V2X," Panasonic, 3GPP TSG RAN WG1 #103-e, R1-2008381, e-Meeting—Oct. 26 through Nov. 13, 2020.

"WID revision: NR sidelink enhancement," LG Electronics, 3GPP TSG RAN Meeting #88-e, RP-201385, e-Meeting—Jun. 29 through Jul. 3, 2020.

Discussion on single link demodulation test for NR V2X, Discussion on single link demodulation test for NR V2X, Electronic Meeting, Nov. 2-13, 2020, Oct. 23, 2020, R4-2014417.

Office Action issued on Jul. 26, 2025 in Chinese Patent Application No. 202180074069.7 with English translation (Note: NPL "On NR V2X Physical Layer Structure" and NPL "Remaining issue on physical layer structure for sidelink in NR V2X" cited therein are already of record.).

\* cited by examiner

METHOD AND APPARATUS FOR TRANSMITTING SCI IN SIDELINK COMMUNICATION

CROSS-REFERENCE OF RELATED APPLICATIONS

The present application is a continuation-in-part of International Patent Application No. PCT/KR2021/015589, filed Nov. 1, 2021, which claims priority to Korean Patent Application Number 10-2021-0148004, filed Nov. 1, 2021, and U.S. Provisional patent application Number U.S. 63/109,307, filed Nov. 3, 2020, the entire contents of which are incorporated herein for all purposes by these references

BACKGROUND OF THE PRESENT DISCLOSURE

Field of the Present Disclosure

The present disclosure relates to a sidelink communication technique, and more particularly, to a sidelink control information (SCI) mapping technique for reducing power consumption in a procedure of receiving SCI.

Description of Related Art

A Fifth-Generation (5G) communication system (e.g., New Radio (NR) communication system) which utilizes a frequency band higher than a frequency band of a Fourth-Generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels. Sidelink communication may be performed using configured grant (CG) resources. The CG resources may be periodically configured, and periodic data (e.g., periodic sidelink data) may be transmitted using the CG resources.

Meanwhile, a terminal may receive sidelink control information (SCI) from another terminal for resource allocation, and may allocate a resource based on information element(s) included in the SCI. The SCI may include first-stage SCI and/or second-stage SCI. Symbol(s) to which the first-stage SCI is mapped within a physical resource may be the same as symbol(s) to which the second-stage SCI is mapped. Alternatively, the first-stage SCI may be first mapped in the time domain, and the second-stage SCI may be mapped from a symbol subsequent to an end symbol to which the first-stage SCI is mapped.

Because a battery capacity of a terminal carried by a pedestrian (hereinafter referred to as 'P-terminal') is not large, power saving operations for the P-terminal are required. When the second-stage SCI is mapped from the symbol subsequent to the end symbol among the symbols to which the first-stage SCI is mapped, power consumption of the P-terminal may increase. Therefore, methods for solving the above problems are required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an SCI mapping method for reducing power consumption in a procedure of receiving SCI.

An operation method of a transmitting terminal, according to various exemplary embodiments of the present disclosure for achieving the above-described objective, may include: receiving, from a base station, configuration information of a sidelink (SL) subchannel size set to a size equal to or greater than a threshold value to save power of a receiving terminal; multiplexing a physical sidelink control channel (PSCCH) and a first physical sidelink shared channel (PSSCH) demodulation reference signal (DMRS) in a frequency domain when the SL subchannel size is greater than or equal to the threshold value; and mapping second-stage sidelink control information (SCI) to a symbol where the first PSSCH DMRS is located.

The threshold value may be 20 physical resource blocks (PRBs), and the SL subchannel size may be greater than or equal to the PSCCH size.

The PSCCH size may be set to a maximum value or less to save power of the receiving terminal.

When the PSCCH size is set to be less than or equal to the maximum value, new first-stage SCI including only specific information elements may be used.

The operation method may further include receiving information allowing use of the new first-stage SCI from the base station.

An operation method of a transmitting terminal, according to various exemplary embodiments of the present disclosure for achieving the above-described objective, may include: receiving, from a base station, configuration information of a sidelink (SL) subchannel size and configuration information of a physical sidelink control channel (PSCCH) size; multiplexing a PSCCH and a first physical sidelink shared channel (PSSCH) demodulation reference signal (DMRS) in a frequency domain regardless of the PSCCH size when the SL subchannel size is less than a threshold value; and mapping second-stage sidelink control information (SCI) to a symbol where the first PSSCH DMRS is located.

The operation method may further include receiving, from the base station, information allowing multiplexing of the PSCCH and the first PSSCH DMRS in the frequency domain regardless of the PSCCH size when the SL subchannel size is less than the threshold value.

The threshold value may be 20 physical resource blocks (PRBs), and the SL subchannel size may be greater than or equal to the PSCCH size.

The PSCCH size may be set to a maximum value or less to save power of the receiving terminal.

When the PSCCH size is set to be less than or equal to the maximum value, new first-stage SCI including only specific information elements may be used, and information allowing use of the new first-stage SCI may be received from the base station.

An operation method of a transmitting terminal, according to various exemplary embodiments of the present disclosure for achieving the above-described objective, may include: mapping first-stage sidelink control information (SCI) to one or more symbols; mapping second-stage SCI to a preceding symbol of a symbol in which a first physical sidelink shared channel (PSSCH) demodulation reference signal (DMRS) is located; and mapping the first PSSCH DMRS after the second-stage SCI in a time domain, wherein the preceding symbol is included in the one or more symbols.

The operation method may further include: receiving, from a base station, information allowing the second-stage SCI to be mapped to a front region within a slot regardless of a location of the first PSSCH DMRS.

The second-stage SCI may be mapped to the front region within the slot, regardless of the location of the first PSSCH DMRS as well as a sidelink (SL) subchannel size and a physical sidelink control channel (PSCCH) size.

The operation method may further include: receiving, from the base station, configuration information of an SL subchannel size set to a maximum value or less than the maximum value to reduce a number of performing blind detections for the first-stage SCI.

According to an exemplary embodiment of the present disclosure, second-stage SCI may be mapped to a front region within a slot. For example, first-stage SCI and second-stage SCI may be mapped to the same symbol(s). Accordingly, power consumption of a receiving terminal may be reduced in an operation of receiving the SCI (e.g., first-stage SCI and/or second-stage SCI). Furthermore, to reduce the number of times physical sidelink control channel (PSCCH) blind detection is performed, a frequency domain size of a resource pool may be limited. In the instant case, the number of PSCCH blind detections performed by the receiving terminal may be decreased, and thus power consumption of the receiving terminal may be reduced.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". Furthermore, "one or more of A and B" may refer to "one or more of A or B" or "one or more of combinations of one or more of A and B".

In exemplary embodiments of the present disclosure, (re)transmission may mean 'transmission', 'retransmission', or 'transmission and retransmission', (re)configuration may mean 'configuration', 'reconfiguration', or 'configuration and reconfiguration', (re)connection may mean 'connection', 'reconnection', or 'connection and reconnection', and (re)access may mean 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in an exemplary embodiment of the present disclosure are only used to describe specific exemplary embodiments of the present disclosure, and are not intended to limit the present disclosure. The singular expression includes the plural expression unless the context clearly dictates otherwise. In an exemplary embodiment of the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which the present disclosure belongs. Terms that are generally used and have been in dictionaries should be construed as including meanings matched with contextual meanings in the art. In the present description, unless defined clearly, terms are not necessarily construed as including formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

Figure 1:
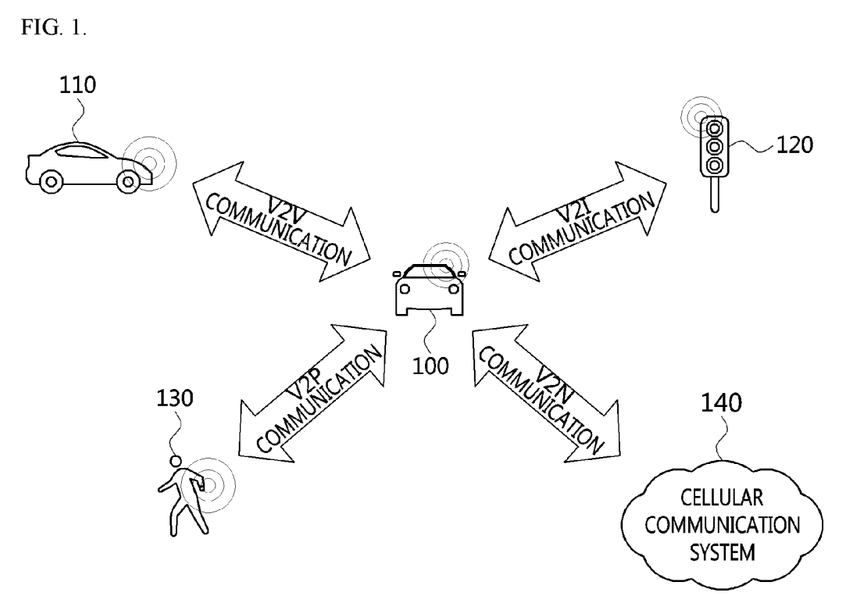
FIG. 1 is a conceptual diagram illustrating V2X communication scenarios.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In the instant case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In the instant case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may be configured to generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In the instant case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
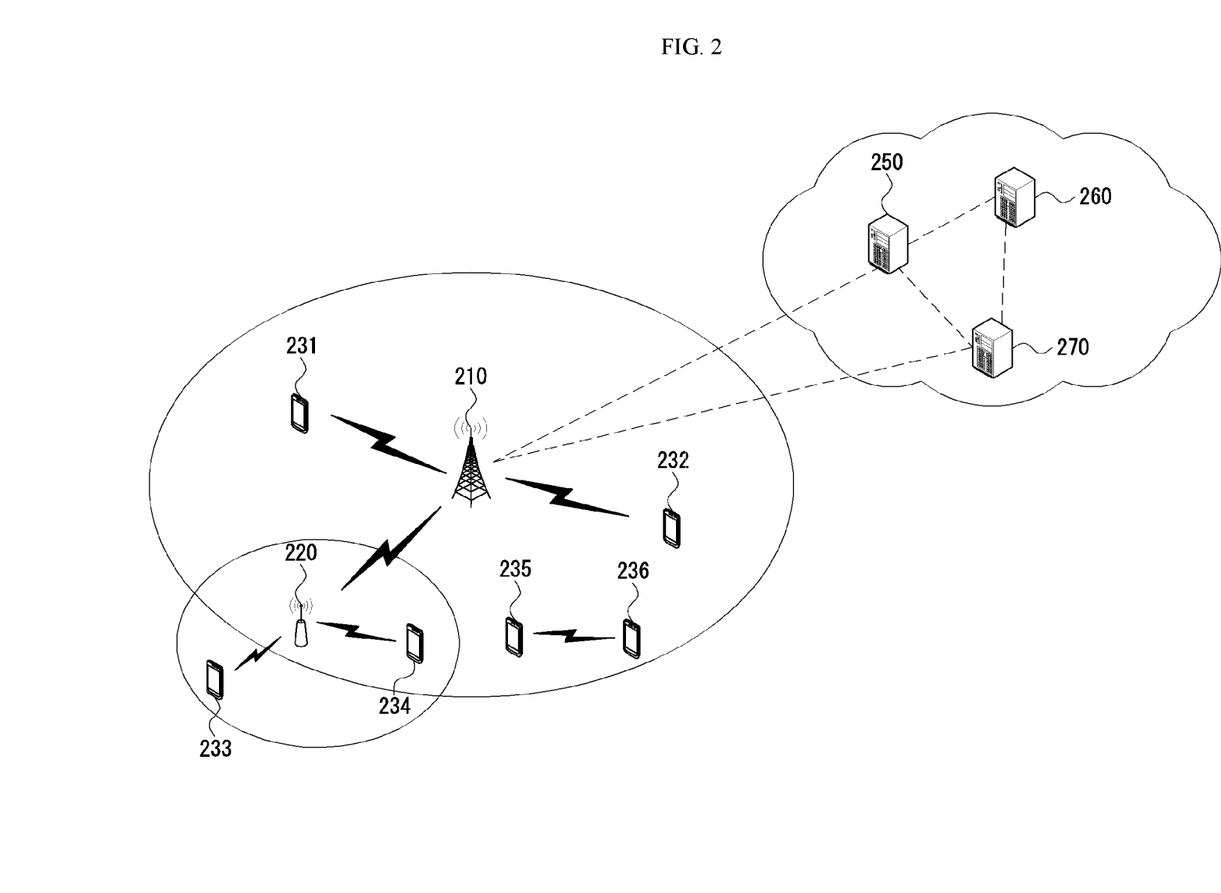
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

Furthermore, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by use of at least one communication technology among a Code Division Multiple Access (CDMA) technology, a Time Division Multiple Access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figure 3:
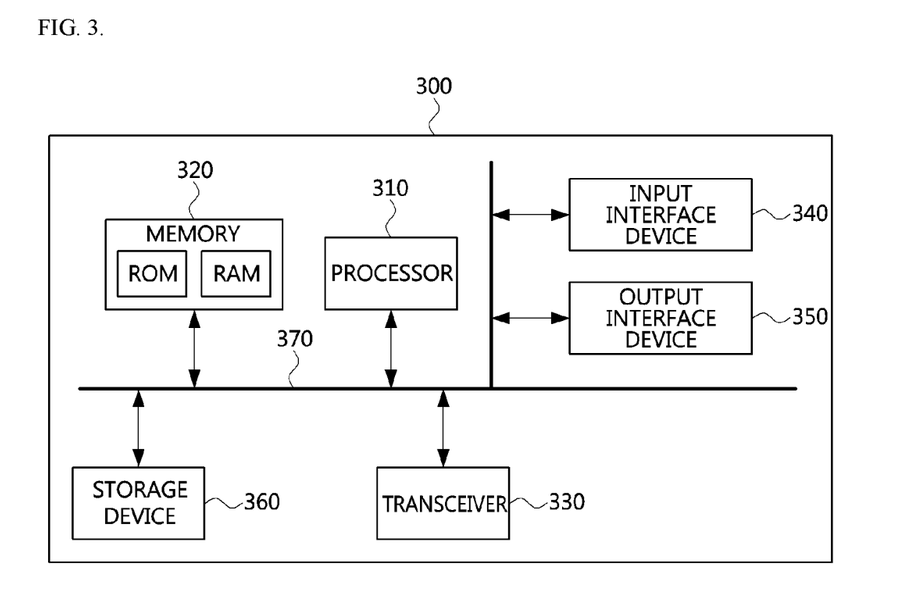
FIG. 3 is a conceptual diagram illustrating an exemplary embodiment of a communication node forming a cellular communication system.

FIG. 3 is a conceptual diagram illustrating an exemplary embodiment of a communication node forming a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
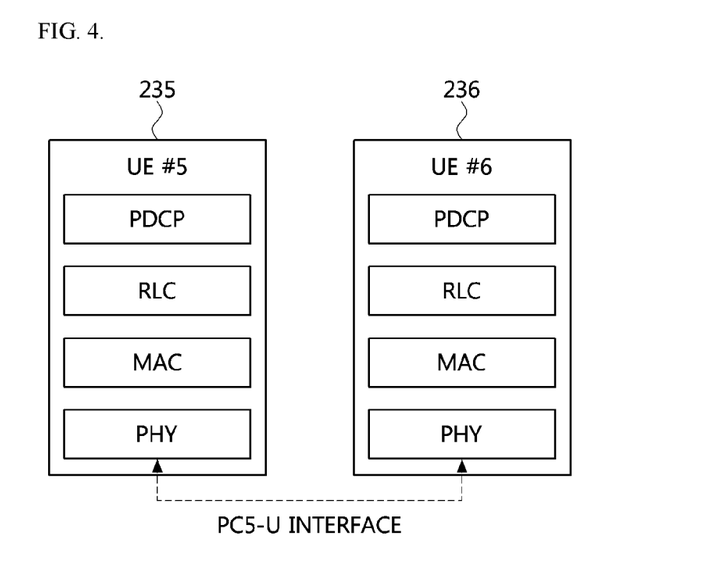
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
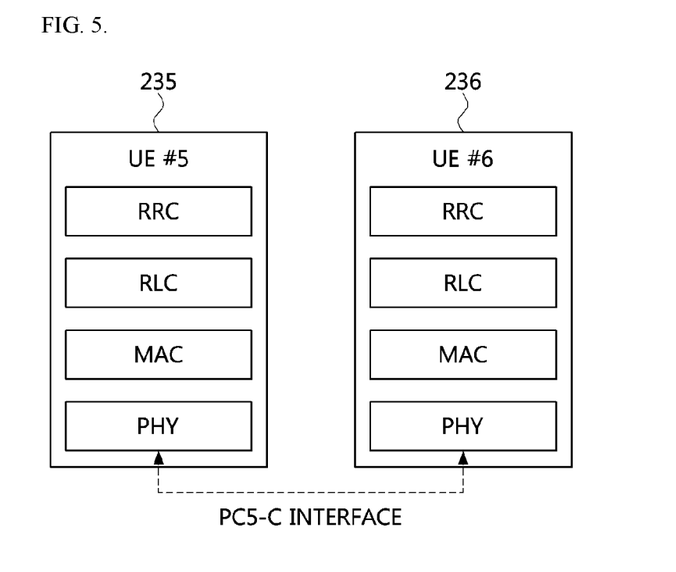
FIG. 5 is a block diagram illustrating a first exemplary embodiment of a control plane protocol stack of a UE performing sidelink communication.
Figure 6:
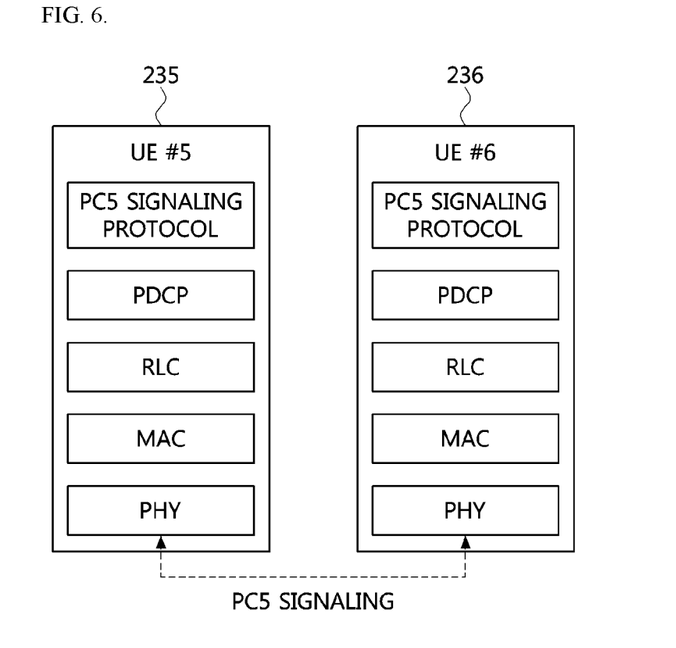
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIG. 5 and FIG. 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |

TABLE 2-continued

| Sidelink TM | Description |
| --- | --- |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In the instant case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In the instant case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In the instant case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In the instant case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments of the present disclosure, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. Furthermore, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The first-stage SCI may include or more information elements among priority information, frequency resource assignment information, time resource assignment information, resource reservation period information, demodulation reference signal (DMRS) pattern information, second-stage SCI format information, a beta offset indicator, the number of DMRS ports, and modulation and coding scheme (MCS) information. The second-stage SCI may include one or more information elements among a HARQ processor identifier (ID), a redundancy version (RV), a source ID, a destination ID, CSI request information, a zone ID, and communication range requirements.

Meanwhile, the second-stage SCI may be mapped from the first PSSCH symbol including a PSSCH DMRS. In exemplary embodiments of the present disclosure, mapping of a signal, information, and/or data to a physical resource (e.g., symbol) may include the meaning that the signal, information, and/or data is transmitted through the mapped physical resource. The location of the PSSCH DMRS (e.g., DMRS) may be determined based on Table 3 below.

TABLE 3

| $l_d$ in sym-bols | DM-RS position I | | | | | |
|---|---|---|---|---|---|---|
| | PSCCH duration 2 symbols Number of PSSCH DM-RS | | | PSCCH duration 3 symbols Number of PSSCH DM-RS | | |
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | 3, 8 | 1, 4, 7 | | 4, 8 | 1, 4, 7 | |
| 10 | 3, 8 | 1, 4, 7 | | 4, 8 | 1, 4, 7 | |
| 11 | 3, 10 | 1, 5, 9 | 1, 4, 7, 10 | 4, 10 | 1, 5, 9 | 1, 4, 7, 10 |
| 12 | 3, 10 | 1, 5, 9 | 1, 4, 7, 10 | 4, 10 | 1, 5, 9 | 1, 4, 7, 10 |
| 13 | 3, 10 | 1, 6, 11 | 1, 4, 7, 10 | 4, 10 | 1, 6, 11 | 1, 4, 7, 10 |

$l_d$ may indicate a duration of resources scheduled for transmission of a PSSCH and a PSCCH associated therewith. $l_d$ may be set in units of symbols. The location of the PSSCH DMRS may vary according to a PSCCH duration (e.g., 2 symbols or 3 symbols). The location of the PSSCH DMRS may be determined according to the number of PSSCH DMRSs within one slot. Based on Table 3, sidelink channels and/or signals may be mapped to physical resources as follows.

Figure 7:
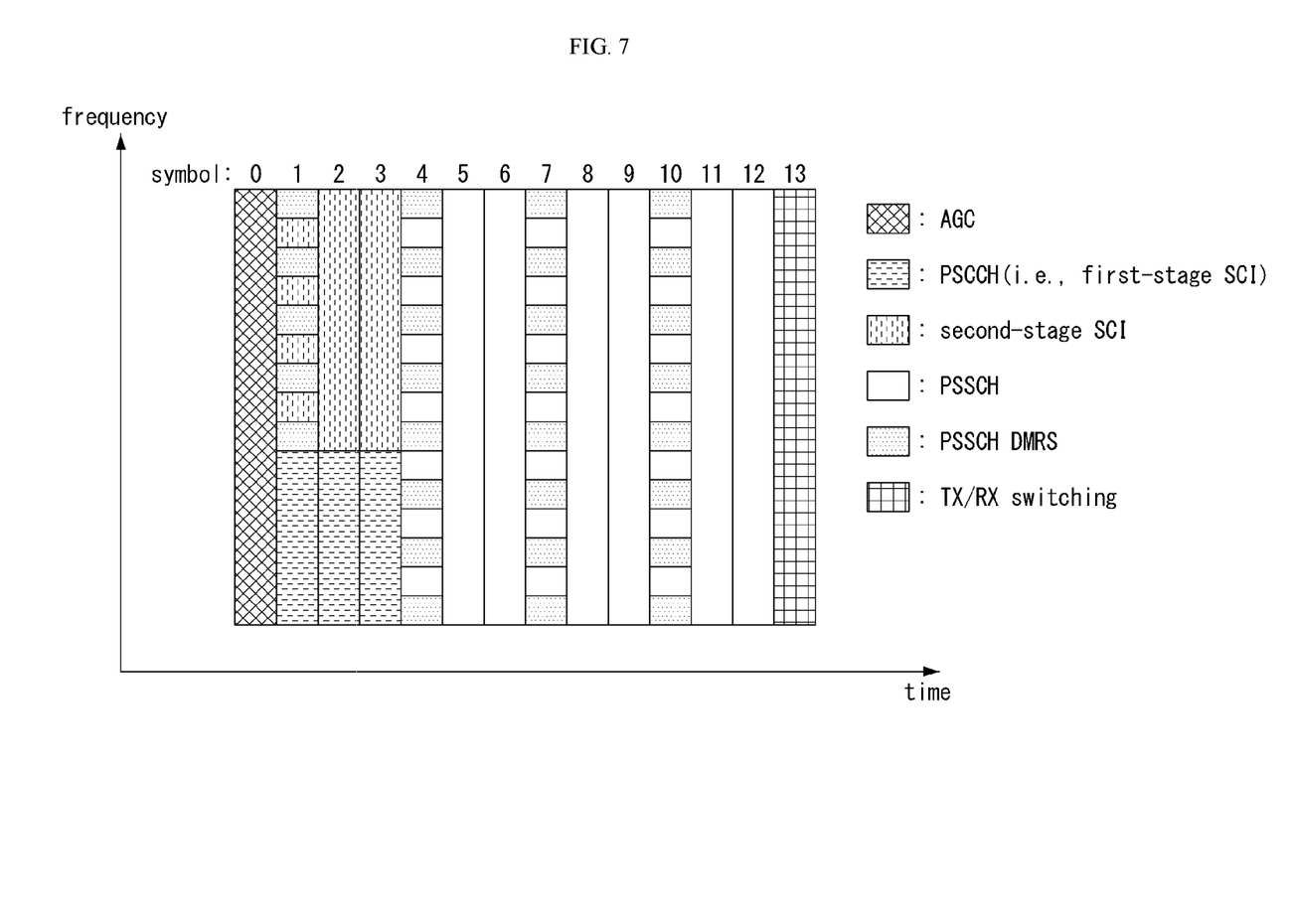
FIG. 7 is a conceptual diagram illustrating a first exemplary embodiment of physical resources to which sidelink channels and/or signals are mapped.

FIG. 7 is a conceptual diagram illustrating a first exemplary embodiment of physical resources to which sidelink channels and/or signals are mapped.

Referring to FIG. 7, a PSCCH (e.g., first-stage SCI) may be mapped to three symbols (e.g., symbols #1 to #3) within one slot (e.g., one sidelink (SL) slot), and a PSSCH may be mapped to twelve symbols within one slot. The PSSCH may be scheduled by first-stage SCI and/or second-stage SCI. When four PSSCH DMRSs are used, the four PSSCH DMRSs may be mapped to the symbols #1, #4, #7, and #10 within one slot. The second-stage SCI may be mapped from the symbol #1 in which the first PSSCH DMRS exists.

In the PSSCH DMRS mapping procedure, a sidelink subchannel size (e.g., SL subchannel size) and/or a PSCCH size (e.g., sl-FreqResourcePSCCH) may be additionally considered. The SL subchannel size may be set by higher layer signaling (e.g., system information and/or RRC message). For example, the SL subchannel size may be set to 10 physical resource blocks (PRBs), 12 PRBs, 15 PRBs, 20 PRBs, 25 PRBs, 50 PRBs, 75 PRBs, or 100 PRBs. The PSCCH size may be set by higher layer signaling. For example, the PSCCH size may be set to 10 PRBs, 12 PRBs, 15 PRBs, 20 PRBs, or 25 PRBs. The PSCCH size may be set equal to or less than the SL subchannel size.

The PSCCH and the PSSCH DMRS may be mapped to the same symbol or different symbols in the time domain. That the PSCCH and the PSSCH DMRS are mapped to a same symbol in the time domain may mean that the PSCCH and the PSSCH DMRS are multiplexed in the frequency domain. The symbol(s) to which the PSCCH and the PSSCH DMRS are mapped may be configured in consideration of the SL subchannel size and/or the PSCCH size. Depending on the SL subchannel size and/or the PSCCH size, the PSCCH and the PSSCH DMRS may not be mapped to the same symbol. When the SL subchannel size is less than 20 PRBs, the PSCCH and the PSSCH DMRS may not be mapped to the same symbol. For example, when the SL subchannel size is 15 PRBs and the PSCCH size is 10 PRBs, the PSCCH and the PSSCH DMRS may not be mapped to the same symbol. When the PSCCH and the PSSCH DMRS are not mapped to the same symbol, sidelink channels and/or signals may be mapped to physical resources as follows.

Figure 8:
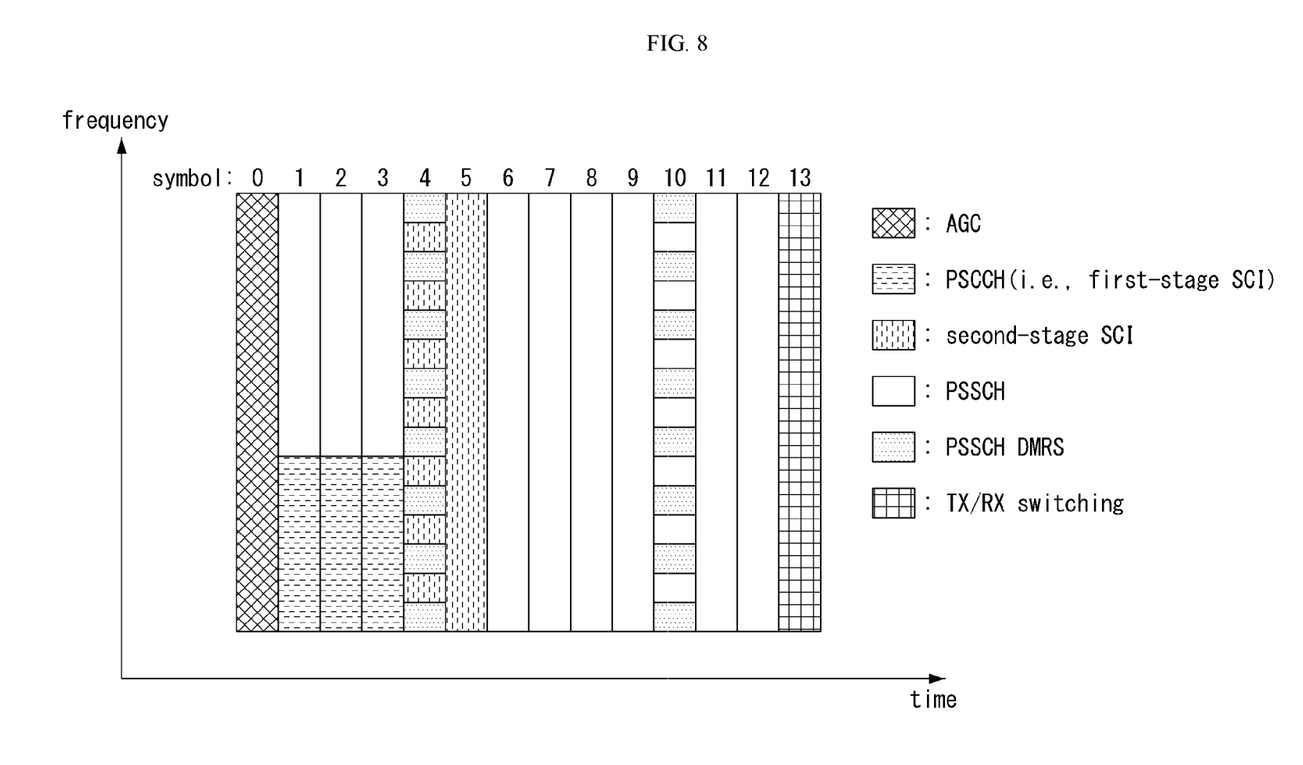
FIG. 8 is a conceptual diagram illustrating a second exemplary embodiment of physical resources to which sidelink channels and/or signals are mapped.

FIG. 8 is a conceptual diagram illustrating a second exemplary embodiment of physical resources to which sidelink channels and/or signals are mapped.

Referring to FIG. 8, a PSCCH (e.g., first-stage SCI) may be mapped to three symbols (e.g., symbols #1 to #3) within one slot, and a PSSCH may be mapped to twelve symbols within one slot. The PSSCH may be scheduled by first-stage SCI and/or second-stage SCI. When two PSSCH DMRSs are used, the two PSSCH DMRSs may be mapped to the symbols #4 and #10 within one slot. The second-stage SCI may be mapped from the symbol #4 where the first PSSCH DMRS exists. In the instant case, because the second-stage SCI is mapped after the first-stage SCI (e.g., PSCCH) in the time domain, a period on which the terminal monitors to receive the SCI (e.g., first-stage SCI and second-stage SCI) may be increased. Accordingly, power consumption of the terminal (e.g., pedestrian (P)-terminal) may increase. The P-terminal may be a terminal carried by a pedestrian.

In the following exemplary embodiments of the present disclosure, second-stage SCI mapping conditions and methods for power saving of a terminal (e.g., P-terminal) will be described. A second-stage SCI mapping method for a P-terminal (e.g., terminal supporting a power saving operation) may be configured independently from a second-stage SCI mapping method for a terminal (e.g., vehicle (V)-terminal) which is not a P-terminal. That is, the second-stage SCI mapping method for a P-terminal may be different from the second-stage SCI mapping method for a terminal which is not a P-terminal. The V-terminal may be a terminal mounted on a vehicle.

[Second-Stage SCI Mapping Method]

The transmitting terminal may map second-stage SCI to a front region (e.g., symbols #0 to #4) of a slot. For example, the transmitting terminal may map the second-stage SCI from a symbol subsequent to an automatic gain control (AGC) symbol within a slot. The AGC symbol may be a symbol used for an AGC operation. Alternatively, the transmitting terminal may map the second-stage SCI from a symbol preceding a specific symbol within a slot. The base station may configure terminal(s) (e.g., transmitting terminal and/or receiving terminal) to be allowed to perform the above-described mapping operation. Alternatively, the base station may transmit information indicating that the above-described mapping operation is enabled using a higher layer message, and the transmitting terminal may transmit to the receiving terminal first-stage SCI indicating that the above-described mapping operation is used.

Here, the receiving terminal may be a P-terminal. In the instant case, the receiving terminal may expect that the second-stage SCI is mapped from the next symbol of the AGC symbol, and may perform a reception operation (e.g., decoding operation) of the second-stage SCI from the next symbol of the AGC symbol. Alternatively, the receiving terminal may expect that the second-stage SCI is mapped from the symbol preceding the specific symbol, and may perform a reception operation of the second-stage SCI from the symbol preceding the specific symbol. Accordingly, power consumption of the receiving terminal may be reduced in the reception operation of the second-stage SCI.

Detailed methods of the second-stage SCI mapping method may be as follows.

[Mapping Method 1]

The base station may set the SL subchannel size to one value or a value equal to or greater than a threshold value for a terminal (e.g., P-terminal or a terminal supporting a power saving operation). This may be referred to as 'mapping method 1'. For example, the base station may set the SL subchannel size to 20 PRBs or more, and transmit configuration information of the SL subchannel size to the terminal(s). In the instant case, the SL subchannel size may be set to 20 PRBs, 25 PRBs, 50 PRBs, 75 PRBs, or 100 PRBs. When the SL subchannel size is set to 20 PRBs or more, a PSCCH may always be multiplexed with a PSSCH DMRS (e.g., the first PSSCH DMRS) in the frequency domain. That is, the PSCCH and the PSSCH DMRS may be mapped to the same symbol in the time domain.

When the SL subchannel size increases, a frequency domain size of a resource pool used by the terminal may increase. When the frequency domain size of the resource pool increases, the number of PSCCH blind detections performed by the terminal(s) in the resource pool may increase. In the instant case, power consumption of the terminal (e.g., P-terminal) may increase. Accordingly, the base station may set the SL subchannel size for a P-terminal to 20 PRBs, and may transmit configuration information of the SL subchannel size. That is, the SL subchannel size for a P-terminal may be fixed to 20 PRBs.

[Mapping Method 2]

Even when the SL subchannel size is smaller than 20 PRBs, the terminal (e.g., P-terminal) may be allowed to multiplex the PSCCH and the PSSCH DMRS (e.g., the first PSSCH DMRS) in the frequency domain regardless of the PSCCH size. This may be referred to as 'mapping method 2'. The base station may transmit information indicating that the mapping method 2 is allowed to the terminal(s) using at least one of system information, RRC message, MAC CE, or control information. Alternatively, the base station may transmit information indicating that the mapping method 2 is enabled using a higher layer message, and the transmitting terminal may transmit to the receiving terminal first-stage SCI including information indicating that the mapping method 2 is used.

When the mapping method 2 is allowed, the transmitting terminal may multiplex the PSCCH (e.g., first-stage SCI) and the PSSCH DMRS (e.g., first PSSCH DMRS) in the frequency domain regardless of the PSCCH size. Furthermore, the transmitting node may map the second-stage SCI to the symbol where the first PSSCH DMRS is located or from the symbol where the first PSSCH DMRS is located. Therefore, the first-stage SCI and the second-stage SCI may be transmitted in the same symbol(s). The receiving terminal may expect the PSCCH and the PSSCH DMRS to be multiplexed in the frequency domain regardless of the PSCCH size, and perform reception operations (e.g., decoding operations) of the first-stage SCI and the second-stage SCI in the same symbol(s).

[Mapping Method 3]

Regardless of a location of the PSSCH DMRS (e.g., the first PSSCH DMRS), the second-stage SCI (e.g., second-stage SCI of a P-terminal) may be allowed to be mapped to a front region (e.g., the next symbol of the AGC symbol or a symbol preceding a specific symbol) within a slot. This may be referred to as 'mapping method 3'. In the instant case, the second-stage SCI may be mapped in the symbol(s) preceding the symbol in which the PSSCH DMRS (e.g., the first PSSCH DMRS) is located. Furthermore, when the mapping method 3 is used, the second-stage SCI may be mapped to a front region within a slot regardless of the SL subchannel size and the PSCCH size as well as the location of the PSSCH DMRS. The base station may transmit information indicating that the mapping method 3 is allowed to the terminal(s) using at least one of system information, RRC message, MAC CE, or control information. Alternatively, the base station may transmit a higher layer message including information indicating that the mapping method 3 is enabled, and the transmitting terminal may transmit to the receiving terminal first-stage SCI including information indicating that the mapping method 3 is used.

When the mapping method 3 is allowed, the transmitting terminal may map the second-stage SCI to a physical resource (e.g., symbol(s) preceding the symbol in which the first PSSCH DMRS is located) regardless of the location of the PSSCH DMRS. In the instant case, the first-stage SCI and the second-stage SCI may be mapped to the same symbol(s). The receiving terminal (e.g., P-terminal) may expect the second-stage SCI to be mapped to a physical resource regardless of the location of the PSSCH DMRS, and may perform a reception operation of the second-stage SCI in the symbol(s) preceding the symbol where the PSSCH DMRS is located. For example, the receiving terminal may perform reception operations of the first-stage SCI and the second-stage SCI in the same symbol(s).

[Mapping Method 4]

Regardless of the SL subchannel size and the PSCCH size, there may be cases in which the second-stage SCI is mapped from the fourth symbol (e.g., symbol #3) within a slot. Here, the number of PSSCH DMRSs may be two. In the above-described situation, the PSSCH DMRS (e.g., the first PSSCH DMRS) for the terminal (e.g., P-terminal) may always be mapped from a front region (e.g., the next symbol of the AGC symbol) within the slot. Because the second-stage SCI may be mapped from the symbol where the first PSSCH DMRS is located, the second-stage SCI may also be mapped to the front region within the slot. This may be referred to as 'mapping method 4'. To support the mapping method 4, the location of the first PSSCH DMRS may be set to the next symbol (e.g., symbol #1) of the AGC symbol as shown in Table 4 or Table 5 below.

TABLE 4

| $l_d$ in sym-bols | DM-RS position 1 | | | | | |
|---|---|---|---|---|---|---|
| | PSCCH duration 2 symbols Number of PSSCH DM-RS | | | PSCCH duration 3 symbols Number of PSSCH DM-RS | | |
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | | 1, 4, 7 | | | 1, 4, 7 | |
| 10 | | 1, 4, 7 | | | 1, 4, 7 | |
| 11 | | 1, 5, 9 | 1, 4, 7, 10 | | 1, 5, 9 | 1, 4, 7, 10 |
| 12 | | 1, 5, 9 | 1, 4, 7, 10 | | 1, 5, 9 | 1, 4, 7, 10 |
| 13 | | 1, 6, 11 | 1, 4, 7, 10 | | 1, 6, 11 | 1, 4, 7, 10 |

TABLE 5

| $l_d$ in sym-bols | DM-RS position 1 | | | | | |
|---|---|---|---|---|---|---|
| | PSCCH duration 2 symbols Number of PSSCH DM-RS | | | PSCCH duration 3 symbols Number of PSSCH DM-RS | | |
| | 2 | 3 | 4 | 2 | 3 | 4 |
| 6 | 1, 5 | | | 1, 5 | | |
| 7 | 1, 5 | | | 1, 5 | | |

TABLE 5-continued

| $l_d$ in symbols | PSCCH duration 2 symbols Number of PSSCH DM-RS | | | PSCCH duration 3 symbols Number of PSSCH DM-RS | | |
|---|---|---|---|---|---|---|
| | 2 | 3 | 4 | 2 | 3 | 4 |
| 8 | 1, 5 | | | 1, 5 | | |
| 9 | 1, 8 | 1, 4, 7 | | 1, 8 | 1, 4, 7 | |
| 10 | 1, 8 | 1, 4, 7 | | 1, 8 | 1, 4, 7 | |
| 11 | 1, 10 | 1, 5, 9 | 1, 4, 7, 10 | 1, 10 | 1, 5, 9 | 1, 4, 7, 10 |
| 12 | 1, 10 | 1, 5, 9 | 1, 4, 7, 10 | 1, 10 | 1, 5, 9 | 1, 4, 7, 10 |
| 13 | 1, 10 | 1, 6, 11 | 1, 4, 7, 10 | 1, 10 | 1, 6, 11 | 1, 4, 7, 10 |

As another method for supporting the mapping method 4, the first PSSCH DMRS may be configured to be located at a symbol preceding a specific symbol within a slot. In the instant case, to improve PSSCH decoding performance, when the number of PSSCH DMRSs is two, a location of the second PSSCH DMRS may be set based on Tables 6 to 11 below.

TABLE 6

| $l_d$ in symbols | PSCCH duration 2 symbols Number of PSSCH DM-RS | | | PSCCH duration 3 symbols Number of PSSCH DM-RS | | |
|---|---|---|---|---|---|---|
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | 1, 6 | 1, 4, 7 | | 1, 6 | 1, 4, 7 | |
| 10 | 1, 6 | 1, 4, 7 | | 1, 6 | 1, 4, 7 | |
| 11 | 1, 10 | 1, 5, 9 | 1, 4, 7, 10 | 1, 10 | 1, 5, 9 | 1, 4, 7, 10 |
| 12 | 1, 10 | 1, 5, 9 | 1, 4, 7, 10 | 1, 10 | 1, 5, 9 | 1, 4, 7, 10 |
| 13 | 1, 10 | 1, 6, 11 | 1, 4, 7, 10 | 1, 10 | 1, 6, 11 | 1, 4, 7, 10 |

TABLE 7

| $l_d$ in symbols | PSCCH duration 2 symbols Number of PSSCH DM-RS | | | PSCCH duration 3 symbols Number of PSSCH DM-RS | | |
|---|---|---|---|---|---|---|
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | 1, 7 | 1, 4, 7 | | 1, 7 | 1, 4, 7 | |
| 10 | 1, 7 | 1, 4, 7 | | 1, 7 | 1, 4, 7 | |
| 11 | 1, 10 | 1, 5, 9 | 1, 4, 7, 10 | 1, 10 | 1, 5, 9 | 1, 4, 7, 10 |
| 12 | 1, 10 | 1, 5, 9 | 1, 4, 7, 10 | 1, 10 | 1, 5, 9 | 1, 4, 7, 10 |
| 13 | 1, 10 | 1, 6, 11 | 1, 4, 7, 10 | 1, 10 | 1, 6, 11 | 1, 4, 7, 10 |

TABLE 8

| $l_d$ in symbols | PSCCH duration 2 symbols Number of PSSCH DM-RS | | | PSCCH duration 3 symbols Number of PSSCH DM-RS | | |
|---|---|---|---|---|---|---|
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | (1, 6) or (1, 7) | 1, 4, 7 | | (1, 6) or (1, 7) | 1, 4, 7 | |

TABLE 8-continued

| $l_d$ in symbols | PSCCH duration 2 symbols Number of PSSCH DM-RS | | | PSCCH duration 3 symbols Number of PSSCH DM-RS | | |
|---|---|---|---|---|---|---|
| | 2 | 3 | 4 | 2 | 3 | 4 |
| 10 | (1, 6) or (1, 7) | 1, 4, 7 | | (1, 6) or (1, 7) | 1, 4, 7 | |
| 11 | 1, 6 | 1, 5, 9 | 1, 4, 7, 10 | 1, 6 | 1, 5, 9 | 1, 4, 7, 10 |
| 12 | 1, 6 | 1, 5, 9 | 1, 4, 7, 10 | 1, 6 | 1, 5, 9 | 1, 4, 7, 10 |
| 13 | 1, 6 | 1, 6, 11 | 1, 4, 7, 10 | 1, 6 | 1, 6, 11 | 1, 4, 7, 10 |

TABLE 9

| $l_d$ in symbols | PSCCH duration 2 symbols Number of PSSCH DM-RS | | | PSCCH duration 3 symbols Number of PSSCH DM-RS | | |
|---|---|---|---|---|---|---|
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | (1, 6) or (1, 7) | 1, 4, 7 | | (1, 6) or (1, 7) | 1, 4, 7 | |
| 10 | (1, 6) or (1, 7) | 1, 4, 7 | | (1, 6) or (1, 7) | 1, 4, 7 | |
| 11 | 1, 7 | 1, 5, 9 | 1, 4, 7, 10 | 1, 7 | 1, 5, 9 | 1, 4, 7, 10 |
| 12 | 1, 7 | 1, 5, 9 | 1, 4, 7, 10 | 1, 7 | 1, 5, 9 | 1, 4, 7, 10 |
| 13 | 1, 7 | 1, 6, 11 | 1, 4, 7, 10 | 1, 7 | 1, 6, 11 | 1, 4, 7, 10 |

TABLE 10

| $l_d$ in symbols | PSCCH duration 2 symbols Number of PSSCH DM-RS | | | PSCCH duration 3 symbols Number of PSSCH DM-RS | | |
|---|---|---|---|---|---|---|
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | (1, 6) or (1, 7) | 1, 4, 7 | | (1, 6) or (1, 7) | 1, 4, 7 | |
| 10 | (1, 6) or (1, 7) | 1, 4, 7 | | (1, 6) or (1, 7) | 1, 4, 7 | |
| 11 | 1, 8 | 1, 5, 9 | 1, 4, 7, 10 | 1, 8 | 1, 5, 9 | 1, 4, 7, 10 |
| 12 | 1, 8 | 1, 5, 9 | 1, 4, 7, 10 | 1, 8 | 1, 5, 9 | 1, 4, 7, 10 |
| 13 | 1, 8 | 1, 6, 11 | 1, 4, 7, 10 | 1, 8 | 1, 6, 11 | 1, 4, 7, 10 |

TABLE 11

| $l_d$ in symbols | PSCCH duration 2 symbols Number of PSSCH DM-RS | | | PSCCH duration 3 symbols Number of PSSCH DM-RS | | |
|---|---|---|---|---|---|---|
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | (1, 6) or (1, 7) | 1, 4, 7 | | (1, 6) or (1, 7) | 1, 4, 7 | |
| 10 | (1, 6) or (1, 7) | 1, 4, 7 | | (1, 6) or (1, 7) | 1, 4, 7 | |
| 11 | 1, 9 | 1, 5, 9 | 1, 4, 7, 10 | 1, 9 | 1, 5, 9 | 1, 4, 7, 10 |
| 12 | 1, 9 | 1, 5, 9 | 1, 4, 7, 10 | 1, 9 | 1, 5, 9 | 1, 4, 7, 10 |
| 13 | 1, 9 | 1, 6, 11 | 1, 4, 7, 10 | 1, 9 | 1, 6, 11 | 1, 4, 7, 10 |

Tables 4 to 11 described above may be preconfigured in technical specifications. The base station may inform the terminal(s) of configuration information at least one among Tables 4 to 11 using at least one of system information, RRC message, MAC CE, or control information. When a plurality of tables in Tables 4 to 11 are configured by the base station, the base station may inform the terminal(s) of information indicating table(s) to be used among the plurality of tables by use of at least one of system information, RRC message, MAC CE, or control information. Alternatively, when the plurality of tables in Tables 4 to 11 are configured by the base station, the transmitting terminal may transmit SCI (e.g., first-stage SCI and/or second-stage SCI) including information indicating a table to be used among the plurality of tables.

Furthermore, the base station may transmit information indicating that the mapping method 4 is allowed to the terminal(s) using at least one of system information, RRC message, MAC CE, or control information. Alternatively, the base station may transmit information indicating that the mapping method 4 is enabled using a higher layer message, and the transmitting terminal may transmit to the receiving terminal first-stage SCI including information indicating that the mapping method 4 is used.

When the mapping method 4 is allowed, the transmitting terminal may be configured to determine the location of the PSSCH DMRS based on at least one of Tables 4 to 11, and map the second-stage SCI to a physical resource based on the location of the PSSCH DMRS. The receiving terminal (e.g., P-terminal) may be configured to determine the location of the PSSCH DMRS based on at least one of Tables 4 to 11, expect the second-stage SCI to be mapped to a physical resource based on the location of the PSSCH DMRS, and perform a reception operation of the second-stage SCI based thereon.

[Method for Reducing the Number of PSCCH Blind Detections Performed]

Depending on a frequency domain size of a resource pool, the number of times PSCCH blind detection is performed may vary. For example, as the frequency domain size of the resource pool increases, the number of times PSCCH blind detection is performed may also increase. In the instant case, power consumption of a terminal (e.g., P-terminal) may increase. Therefore, it may be important to reduce the number of times PSCCH blind detection is performed to save power of the terminal. To reduce the number of PSCCH blind detections performed, the base station may set the SL subchannel size (e.g., the maximum value of the SL subchannel size) for the terminal (e.g., P-terminal). For example, the maximum value of the SL subchannel size may be 10 PRBs. In the instant case, the base station may set the SL subchannel size less than or equal to the maximum value, and may transmit configuration information of the SL subchannel size to the terminal(s) (e.g., transmitting terminal, receiving terminal, and P-terminal). Accordingly, the terminal(s) may perform sidelink communication using an SL subchannel having a size less than or equal to the maximum value. Alternatively, the base station may inform the terminal(s) (e.g., transmitting terminal, receiving terminal, and P-terminal) of the maximum value of the SL subchannel size, and in the instant case, the terminal(s) may perform sidelink communication in consideration of the maximum value of the SL subchannel size. For example, a P-terminal and/or another terminal communicating with the P-terminal may perform sidelink communication considering the maximum value of the SL subchannel size. A terminal other than a P-terminal (e.g., a terminal not communicating with the P-terminal) may not consider the maximum value of the SL subchannel size.

Alternatively, to reduce the number of times PSCCH blind detection is performed, the base station may set a resource pool size (e.g., a maximum value of the resource pool size) for a terminal (e.g., P-terminal). For example, the maximum value of the resource pool size for a P-terminal may be 10 PRBs. The above-described method for reducing the number of times PSCCH blind detection is performed may be applied to the above-described second-stage SCI mapping methods 1 to 4.

[Method for Setting a PSCCH Size Small]

To save power of a terminal (e.g., P-terminal), the PSCCH size may be set small. The base station may set the PSCCH size (e.g., a maximum value of the PSCCH size) for a terminal (e.g., P-terminal). For example, the maximum value of the PSCCH size may be 10 PRBs. In the instant case, the base station may set the PSCCH size equal to or less than the maximum value, and may transmit configuration information of the PSCCH size to the terminal(s) (e.g., transmitting terminal, receiving terminal, and P-terminal). Accordingly, the terminal(s) may perform sidelink communication using a PSCCH having a size less than or equal to the maximum value. Alternatively, the base station may inform the terminal(s) (e.g., transmitting terminal, receiving terminal, and P-terminal) of the maximum value of the PSCCH size, and in the instant case, the terminal(s) may perform sidelink communication in consideration of the maximum value of the PSCCH size. For example, a P-terminal and/or another terminal communicating with the P-terminal may perform sidelink communication in consideration of the maximum value of the PSCCH size. A terminal other than a P-terminal (e.g., terminal not communicating with a P-terminal) may not consider the maximum value of the PSCCH size.

Alternatively, a PSCCH and/or SL subchannel having a size smaller than 10 PRBs may be introduced for a terminal (e.g., P-terminal). Information element(s) included in first-stage SCI in the PSCCH having a size of less than 10 PRBs may be different from information element(s) included in first-stage SCI in a PSCCH having a size of 10 PRBs or more. For example, the number of information element(s) included in the first-stage SCI in the PSCCH having a size of less than 10 PRBs may be smaller than the number of information element(s) included in the first-stage SCI in the PSCCH having a size of 10 PRBs or more.

When the PSCCH size is less than 10 PRBs, a new first-stage SCI format including only specific information element(s) or a new first-stage SCI format excluding specific information element(s) may be configured. The new first-stage SCI format may be referred to as 'SCI Format 1-B'. The specific information excluded from the SCI format 1-B may include resource reservation information, frequency resource assignment information, time resource assignment information, and/or resource reservation period information. The base station may transmit to the terminal(s) information allowing the P-terminal to use the SCI format 1-B using at least one of system information, RRC message, MAC CE, or control information. Because the SCI format 1-B does not include resource reservation information, the base station may transmit information indicating that only a random selection operation is allowed in the P-terminal receiving the SCI format 1-B to the terminal(s) using at least one of system information, RRC message, MAC CE, or control information.

The terminal(s) (e.g., transmitting terminal, receiving terminal, and/or P-terminal) may receive the above-described information from the base station, identify that the use of SCI format 1-B is allowed, and identify that only a random selection operation is allowed in the P-terminal receiving the SCI format 1-B. The transmitting terminal may transmit the SCI format 1-B to the P-terminal (e.g., receiving terminal), and the P-terminal may receive the SCI format 1-B from the transmitting terminal. When the SCI format 1-B is received, the P-terminal may perform only a random selection operation. The above-mentioned method of setting the PSCCH size small may be applied to the above-described second-stage SCI mapping methods 1 to 4.

The above-described exemplary embodiment(s), the above-described configuration(s), whether or not the above-described configuration(s) are applied, the above-described condition(s), whether or not the above-described condition(s) are applied, the above-described parameter(s), and whether or not the above-described parameter(s) are applied may be respectively configured in a resource pool-specific, service-specific, cell-specific, or terminal-specific manner by use of at least one of system information, RRC message, MAC CE, control information, or PC5 signaling message.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or may be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of a transmitting user equipment (UE), the method comprising:
   receiving, from a base station, configuration information of a sidelink (SL) subchannel size set to a size equal to or greater than a threshold value to save power of a receiving UE;
   multiplexing a physical sidelink control channel (PSCCH) and a first physical sidelink shared channel (PSSCH) demodulation reference signal (DMRS) in a frequency domain when the SL subchannel size is greater than or equal to the threshold value; and
   mapping second-stage sidelink control information (SCI) to a symbol where the first PSSCH DMRS is located,
   wherein a PSCCH size is set to a maximum value or less than the maximum value to save the power of the receiving UE.

2. The method of claim 1, wherein the threshold value is 20 physical resource blocks (PRBs), and the SL subchannel size is greater than or equal to a PSCCH size.

3. The method of claim 1, wherein when the PSCCH size is set to be less than or equal to the maximum value, new first-stage SCI including only specific information elements is used.

4. The method of claim 3, further including receiving information allowing use of the new first-stage SCI from the base station.

5. A method of a transmitting user equipment (UE), the method comprising:
   receiving, from a base station, configuration information of a sidelink (SL) subchannel size and configuration information of a physical sidelink control channel (PSCCH) size;
   multiplexing a PSCCH and a first physical sidelink shared channel (PSSCH) demodulation reference signal (DMRS) in a frequency domain regardless of the PSCCH size when the SL subchannel size is less than a threshold value; and
   mapping second-stage sidelink control information (SCI) to a symbol where the first PSSCH DMRS is located,
   wherein the PSCCH size is set to a maximum value or less than the maximum value to save power of a receiving UE.

6. The method of claim 5, further including receiving, from the base station, information allowing multiplexing of the PSCCH and the first PSSCH DMRS in the frequency domain regardless of the PSCCH size when the SL subchannel size is less than the threshold value.

7. The method of claim 5, wherein the threshold value is 20 physical resource blocks (PRBs), and the SL subchannel size is greater than or equal to the PSCCH size.

8. The method of claim 5, wherein when the PSCCH size is set to be less than or equal to the maximum value, new first-stage SCI including only specific information elements is used, and information allowing use of the new first-stage SCI is received from the base station.

9. A method of a transmitting user equipment (UE), the method comprising:
   mapping first-stage sidelink control information (SCI) to one or more symbols;
   mapping second-stage SCI to a preceding symbol of a symbol in which a first physical sidelink shared channel (PSSCH) demodulation reference signal (DMRS) is located; and
   mapping the first PSSCH DMRS after the second-stage SCI in a time domain,
   wherein the preceding symbol is included in the one or more symbols, the first-stage SCI is included in a physical sidelink control channel (PSCCH), and a PSCCH size is set to a maximum value or less than the maximum value to save power of a receiving UE.

10. The method of claim 9, further including: receiving, from a base station, information allowing the second-stage SCI to be mapped to a front region within a slot regardless of a location of the first PSSCH DMRS.

11. The method of claim 10, wherein the second-stage SCI is mapped to the front region within the slot, regardless of the location of the first PSSCH DMRS as well as a sidelink (SL) subchannel size and the PSCCH size.

12. The method of claim 9, further including: receiving, from the base station, configuration information of an SL subchannel size set to a maximum value or less than the maximum value to reduce a number of performing blind detections for the first-stage SCI.

* * * * *